United States Patent
Laudon

(10) Patent No.: US 8,195,903 B2
(45) Date of Patent: Jun. 5, 2012

(54) SYSTEM AND METHOD FOR METERING REQUESTS TO MEMORY

(75) Inventor: James P. Laudon, Madison, WI (US)

(73) Assignee: Oracle America, Inc., Redwood City, CA (US)

(*) Notice: Subject to any disclaimer, the term of this patent is extended or adjusted under 35 U.S.C. 154(b) by 1078 days.

(21) Appl. No.: 11/477,733

(22) Filed: Jun. 29, 2006

(65) Prior Publication Data

US 2008/0005511 A1  Jan. 3, 2008

(51) Int. Cl.
*G06F 12/14* (2006.01)

(52) U.S. Cl. .................. 711/163; 711/167; 711/E12.091

(58) Field of Classification Search .................. None
See application file for complete search history.

(56) References Cited

U.S. PATENT DOCUMENTS

| 5,673,416 A | 9/1997 | Chee |
| 6,052,772 A | 4/2000 | Kark |
| 6,272,600 B1 | 8/2001 | Talbot |
| 6,487,645 B1 * | 11/2002 | Clark et al. .................... 711/162 |
| 6,910,095 B2 | 6/2005 | Zsohar |
| 6,976,135 B1 | 12/2005 | Talbot |
| 7,081,896 B1 | 7/2006 | Rao |
| 2006/0184753 A1 | 8/2006 | Jeter |
| 2007/0067532 A1 | 3/2007 | Tischler |

* cited by examiner

*Primary Examiner* — Reginald Bragdon
*Assistant Examiner* — Eric Loonan
(74) *Attorney, Agent, or Firm* — Meyertons, Hood, Kivlin, Kowert & Goetzel, P.C.

(57) ABSTRACT

A memory controller including a control unit for limiting the number of memory requests that are executed within a predetermined time period to regulate power consumption. The control unit may determine a memory request limit indicating the maximum number of memory requests that are allowed to be executed during the predetermined time period based on at least a carry-over limit and a new request limit. The carry-over limit may indicate the maximum number of carry-over memory requests that are allowed during the predetermined time period. The new request limit may indicate the maximum number of new memory requests that are allowed during the predetermined time period. The control unit may further control the number of memory requests that are executed in each of a sequence of predetermined time periods.

16 Claims, 3 Drawing Sheets

SYSTEM AND METHOD FOR METERING REQUESTS TO MEMORY

BACKGROUND OF THE INVENTION

1. Field of the Invention

This invention relates to memory controllers and, more particularly, to a mechanism for controlling memory accesses to regulate power consumption.

2. Description of the Related Art

Typical computer systems are designed to maximize the number of memory accesses that are executed in a particular amount of time. Memory power is a significant component of the total power consumption in modern computer systems. There is typically a tradeoff between system performance and memory power consumption. Since memory power is variable depending on the demands of the applications running on the computer, power and cooling are usually supplied to match the full range of memory power demands. Providing relatively large amounts of power to memory and performing the corresponding cooling operations may improve system performance, but at the same time may result in a poor tradeoff between performance and power.

SUMMARY OF THE INVENTION

Various embodiments are disclosed of a memory controller including a control unit for limiting the number of memory requests that are executed within a predetermined time period to regulate several aspects of power, e.g., peak and average power. The control unit may determine a memory request limit indicating the maximum number of memory requests that are allowed to be executed during the predetermined time period based on at least a carry-over limit and a new request limit. The carry-over limit may indicate the maximum number of carry-over memory requests that are allowed during the predetermined time period. The new request limit may indicate the maximum number of new memory requests that are allowed during the predetermined time period.

In various embodiments, the control unit may control the number of memory requests that are executed in each of a sequence of predetermined time periods. In one embodiment, the control unit may determine the memory request limit for each of the predetermined time periods based on an updated memory request limit from a previous predetermined time period, the carry-over limit, and the new request limit. The updated memory request limit from a previous predetermined time period may correspond to the number of memory requests that were available to be executed during the previous predetermined time period but were not executed, and are now available to be carried over to the current predetermined time period. The memory request limit for the predetermined time period may be equal to the minimum of the updated memory request limit from the previous predetermined time period and the carry-over limit, plus the new request limit.

Figure 1:
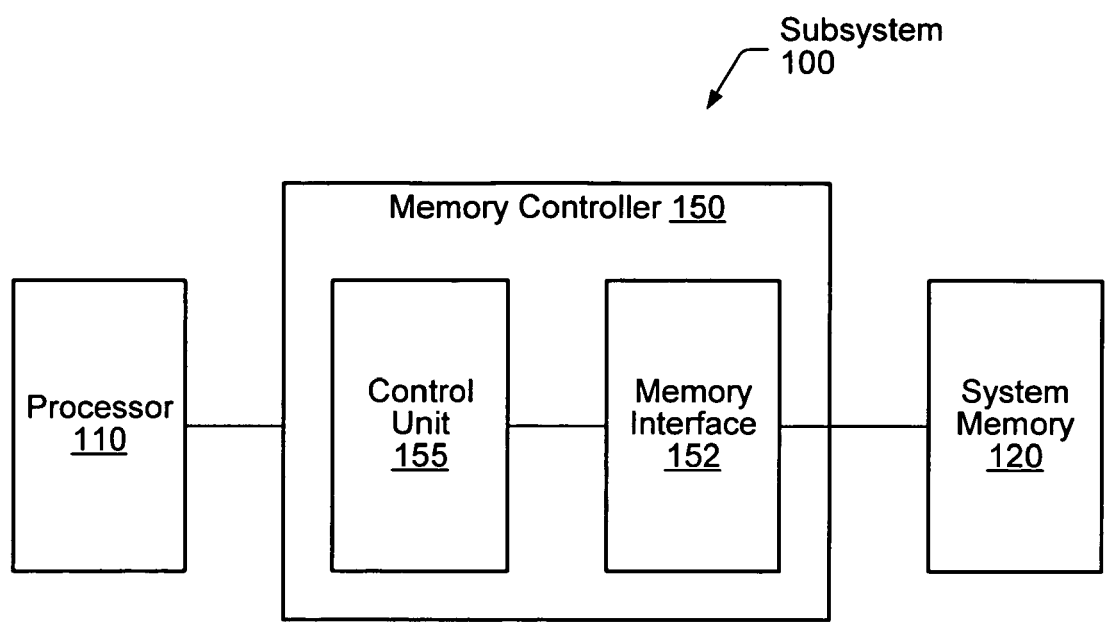
FIG. 1 is a block diagram of one embodiment of a subsystem including a memory controller.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION

Turning now to FIG. 1, a block diagram of one embodiment of a subsystem 100 is shown. Subsystem 100 may be comprised in any of various types of computing or processing systems, e.g., a workstation, a personal computer (PC), a server, a portable computer system, among others, as will be further described below with reference to FIG. 3. As illustrated in the embodiment of FIG. 1, subsystem 100 may include a processor 110, a memory controller 150, and a system memory 120.

Processor 110 may be representative of a processor in the SPARC™ family of processors. However, it is contemplated that in other embodiments, processor 110 may be representative of other types of processors such as processors in the x86 family of processors, for example.

System memory 120 may include one or more memory modules, e.g., configured as Dual In-Line Memory Modules (DIMMs). It is noted, however, that in other embodiments system memory 120 may have other configurations. The memory modules of system memory 120 may include memory devices in the Dynamic Random Access Memory (DRAM) family of devices. For example, a plurality of banks of Synchronous DRAM (SDRAM), Double Data Rate (DDR) SDRAM, DRR2 SDRAM, or Rambus DRAM (RDRAM) devices may be include in each of the memory modules. It is noted, however, that in other embodiments the memory modules may include other types of memory devices. It is further noted that system memory 120 may include one or more of the different levels of system cache, e.g., L1 and L2 cache, and may also include other types of memory, e.g., EEPROMs. In some embodiments, at least a portion of system memory 120 may be on-chip with processor 110.

Memory controller 150 controls the scheduling of memory requests from processor 110 to system memory 120, e.g., read and write requests. As illustrated in the embodiment of FIG. 1, memory controller 150 may include a control unit 155 and a memory interface 152. Control unit 155 limits the number of memory requests that are executed within one or more predetermined time periods to regulate the power demands of subsystem 100, as will be described further below with reference to FIG. 2. Memory interface 152 may be the physical layer between the control logic of memory controller 150 (e.g., control unit 155) and system memory 120. In some embodiments, memory interface 152 may include I/O pads, delay-locked loops (DDLs), on-die terminations, clock and power distribution circuitry, among others, to interface with system memory 120.

It should be noted that the components described with reference to FIG. 1 are meant to be exemplary only, and are not intended to limit the invention to any specific set of components or configurations. For example, in various embodiments, one or more of the components described may be omitted, combined, modified, or additional components included, as desired. For instance, in one embodiment, part of the functionality of control unit 155 may be included in processor 110. In other embodiments, memory controller 150 may be integrated with, or part of, processor 110.

In various embodiments, control unit 155 may control the number of requests to memory 120 that are executed within one or more predetermined time periods to limit both peak and average power demands. In these embodiments, limiting peak power and average power may not only reduce power consumption but may also reduce the amount of cooling that is supplied to subsystem 100. Also, controlling the number of memory requests may allow a system performance versus power tradeoff based on system needs.

Figure 2:
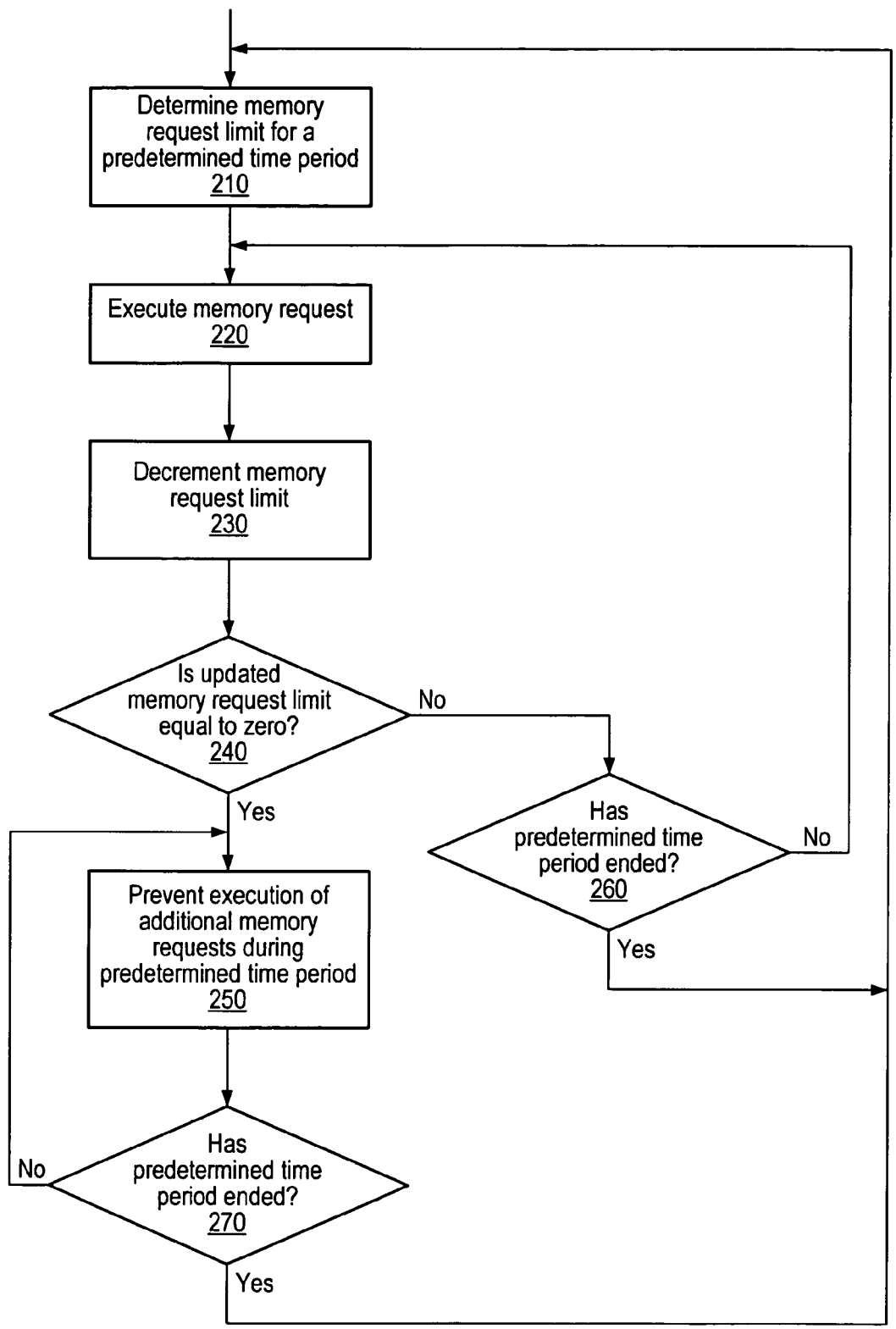
FIG. 2 is a flow diagram illustrating a method for limiting the number of memory requests that are executed within a predetermined time, according to one embodiment.

FIG. 2 is a flow diagram illustrating a method for controlling requests to memory 120, according to one embodiment. It should be noted that in various embodiments, some of the steps shown may be performed concurrently, in a different order than shown, or omitted. Additional steps may also be performed as desired.

Referring collectively to FIG. 2 and FIG. 1, during operation, control unit 155 may determine a memory request limit for a predetermined time period (block 210). The memory request limit may indicate the maximum number of memory requests that are allowed to be executed (e.g., by memory controller 150) during the predetermined time period.

Control unit 155 may determine the memory request limit for the predetermined time period based on at least a carry-over limit and a new request limit. The carry-over limit may indicate the maximum number of memory requests that are allowed to be carried over from a previous time period to the current predetermined time period. In other words, the carry-over limit may indicate the maximum number of carry-over memory requests that are allowed to be executed during the predetermined time period. The new request limit may indicate the maximum number of new memory requests that are allowed during the predetermined time period. In other words, the new request limit may indicate the maximum number of new memory requests that are not carry-over requests that are allowed to be executed during the predetermined time period. It is noted that in various embodiments the carry-over limit and the new request limit may be programmable.

The predetermined time period may be one of a sequence of predetermined time periods for executing memory requests. In various embodiments, the memory request limit for the predetermined time period may be equal to the minimum of an updated memory request limit from a previous predetermined time period and the carry-over limit, plus the new request limit, i.e., memory request limit=min(previous updated memory request limit, carry-over limit)+new request limit. The updated memory request limit from a previous predetermined time period may correspond to the number of memory requests that were available to be executed during the previous predetermined time period but were not executed, and are now available to be carried over to the current predetermined time period. It is noted that in other embodiments the memory request limit may be calculated using equivalent forms of the equation described above; for example, memory request limit=min(previous updated memory request limit+new request limit, carry-over limit+new request limit).

If the predetermined time period is the first time period of a sequence of predetermined time periods, the previous updated memory request limit will be equal to zero. Similarly, if no memory requests are allowed to be carried over from a previous time interval, the carry-over limit will be programmed to be zero. In these examples, since the previous updated memory request limit and/or the carry-over limit may be equal to zero, the memory request limit for the predetermined time period may be equal to the new request limit.

During operation, memory controller 150 may begin executing memory requests according to the calculated memory request limit (block 220). In various embodiments, control unit 155 may decrement the memory request limit for each memory request that is executed during the predetermined time period to update the memory request limit (block 230). The updated memory request limit may indicate the new maximum number of memory requests that are allowed to execute during the remaining time of the predetermined time period. In other words, the memory request limit may be a count that is continuously updated after executing each memory request.

In various embodiments, after executing each memory request and updating the memory request limit, control unit 155 may determine whether the updated memory request limit has counted down to zero (block 240).

If the updated memory request limit is equal to zero, control unit 155 may prevent additional memory requests from executing during the predetermined time period (block 250). Furthermore, after executing the last memory request of the predetermined time period, control unit 155 may determine whether the predetermined time period has elapsed (block 270). If the predetermined time period has not elapsed, control unit 155 may continue preventing additional memory requests from executing during the predetermined time period (block 250). If the predetermined time period has elapsed, the execution process may start over and a memory request limit may be determined for a subsequent predetermined time period (block 210).

If the updated memory request limit is greater than zero, control unit 155 may allow execution of at least one additional memory request, depending on whether the predetermined time period has elapsed (block 260). If the predetermined time period has not elapsed, at least one additional memory request is executed during the predetermined time period (block 220). If the predetermined time period has elapsed, the execution process ends for the predetermined time period and a memory request limit may be determined for a subsequent predetermined time period (block 210). For instance, in one specific example when the memory request limit started at a count of 500, after the predetermined time period elapses, the previous updated memory request limit (i.e., the number of available carry-over requests) may be at a count of 200. Also, the carry-over limit may be set at 700 and the new request limit may be set at 250. In this specific example, using the equation described above (i.e., memory request limit=min (previous updated memory request limit, carry-over limit)+ new request limit), the memory request limit for the subsequent predetermined time period is a count of 450. In another specific example, if the previous updated memory request limit is at a count of 850, the carry-over limit is set at 500, and the new request limit is set at 1000, the memory request limit for the subsequent predetermined time period is a count of 1500.

By limiting the number of memory requests that are executed during a predetermined time period, control unit 155 may limit peak power consumption in subsystem 100. Furthermore, by allowing memory requests to be carried over from previous time periods up to a limit (i.e., carry-over limit), control unit 155 may control both peak power consumption and average power consumption in subsystem 100.

As described above, the carry-over limit and the new request limit may be programmable. In various embodiments, since the new request limit may indicate the maximum number of new requests that are allowed during the predetermined time period (not counting carry-over requests), the new request limit may control average power. Furthermore, since the carry-over limit may indicate the maximum number of carry-over requests that are allowed during the predetermined time period, the sum of the carry-over limit and the new request limit may control peak power.

It is noted that in other embodiments control unit 155 may keep track of the memory request limit and may determine the carry-over requests by other methods. For instance, in some embodiments, control unit 155 may include a request execution count that counts up from zero to the calculated memory request limit. When the request execution count equals the calculated memory request limit, control unit 155 may prevent additional memory requests from executing during the predetermined time period. When control unit 155 detects that the predetermined time period has elapsed, control unit 155 may subtract the request execution count from the calculated memory request limit to determine the available number of memory requests that may be carried over to the subsequent predetermined time period.

In various embodiments, control unit 155 may include one or more registers to store the memory request limit, the carry-over limit, and new request limit, and may include a counter to manage the updating of the memory request limit. Control unit 155 may further include a comparator to determine the minimum value of the previous updated memory request limit and the carry-over limit, and an adder to perform the sum operation described above. It is noted, however, that in some embodiments the functionality of control unit 155 may be implemented by other mechanisms, i.e., one or more of the components of control unit 155 described above may be omitted, combined, modified, or additional components included. For instance, control unit 155 may include other storage mechanisms to store the memory request limit, the carry-over limit, and new request limit. It is further noted that the functionality of control unit 155 may be implemented in software and/or hardware.

As described above, control unit 155 may control the number of memory requests that are executed in each of a sequence of predetermined time periods. It is noted that the predetermined time period may be any fixed interval. For instance, the predetermined time periods may be the time periods between memory refresh cycles. In this particular example, control unit 155 may include a mechanism for monitoring the memory refresh cycles. It is noted that in other embodiments the predetermined time periods may be programmable. In some embodiments, control unit 155 may include a timer that counts up to or counts down from the programmed time period.

Figure 3:
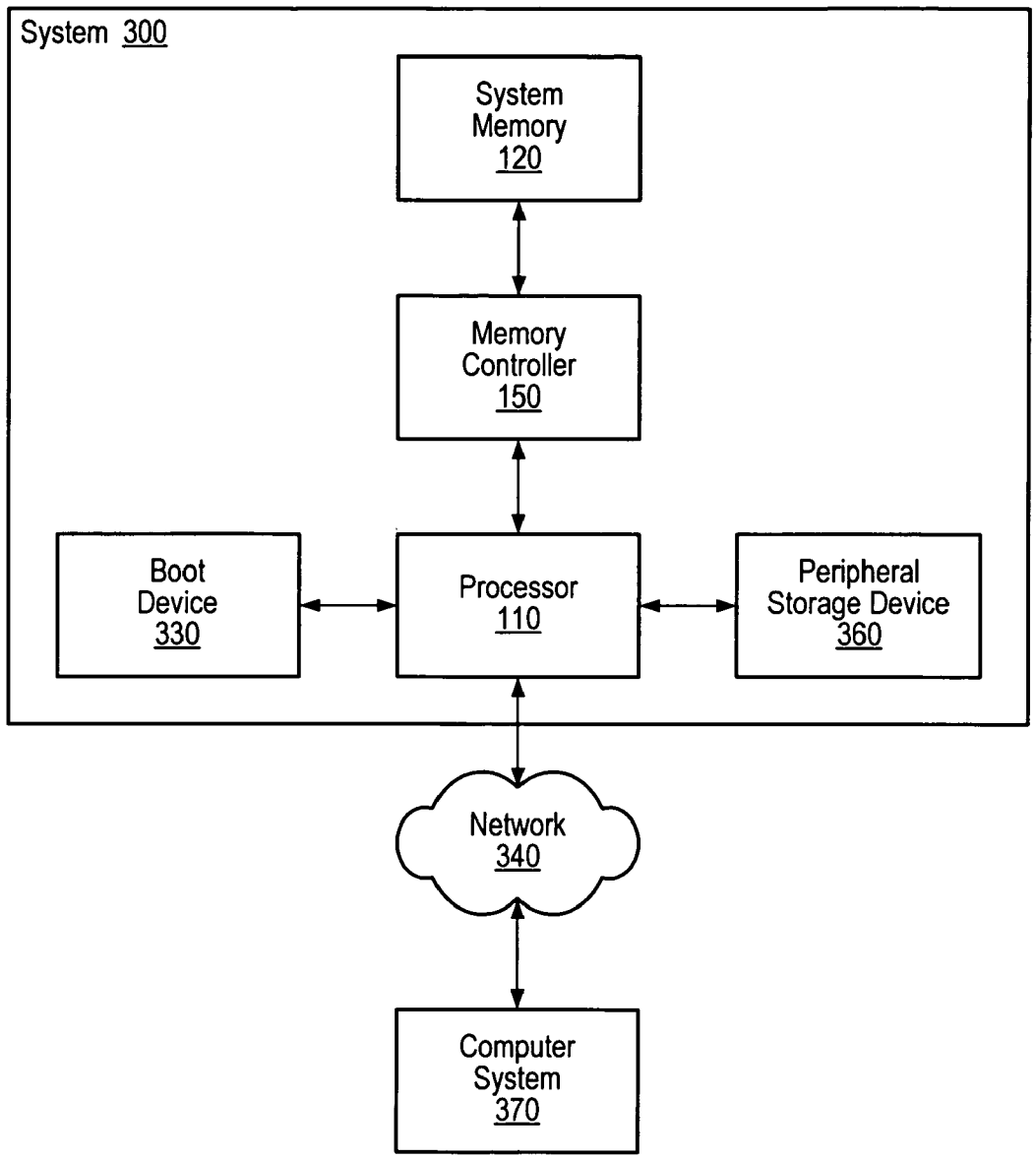
FIG. 3 is a block diagram of one embodiment of a system including the subsystem of FIG. 1.

Turning now to FIG. 3, one embodiment of a system which incorporates subsystem 100 as described above is depicted. In the illustrated embodiment, system 300 includes processor 110, memory controller 150, system memory 120, a boot device 330, and a peripheral storage device 360. System 300 may be connected to a network 340, which may be in turn connected to a computer system 370.

Each of system 300 and computer system 370 may be any of various types of computing or processing systems, e.g., a workstation, personal computer (PC), server, portable computer system, network appliance, Internet appliance, personal digital assistant (PDA), television system, among others. In some embodiments, system 300 may include more than one instance of the devices shown, such as more than one processor 110, for example. System 300 may be configured as a rack-mountable server system, a standalone system, or in any other suitable form factor. While memory controller 150 is depicted as a separate device, in other embodiments memory controller 150 may be integrated with, or part of, processor 310. In various embodiments, as described above, memory controller 150 may include a control unit for limiting the number of memory requests that are executed within a predetermined time period (e.g., control unit 155 of FIG. 1). Similarly, while system memory 120 is depicted as a separate device(s), in other embodiments at least a portion of system memory 120 may be integrated with, or part of, the processor 310.

Peripheral storage device 360, in various embodiments, may include support for magnetic, optical, or solid-state storage media such as hard drives, optical disks, nonvolatile RAM devices, etc. In some embodiments, peripheral storage device 360 may include more complex storage devices such as disk arrays or storage area networks (SANs), which may be coupled to processor 110 via a standard Small Computer System Interface (SCSI), a Fibre Channel interface, an IEEE 1394 interface, or another suitable interface. Additionally, it is contemplated that in other embodiments, any other suitable peripheral devices may be coupled to processor 110, such as multimedia devices, graphics/display devices, standard input/output devices, etc.

Boot device 330 may include a device such as an FPGA or ASIC configured to coordinate initialization and boot of processor 110, such as from a power-on reset state. Additionally, in some embodiments boot device 330 may include a secondary computer system configured to allow access to administrative functions such as debug or test modes of processor 110.

Network 340 may include any suitable devices, media and/or protocol for interconnecting computer systems, such as wired or wireless Ethernet, for example. In various embodiments, network 340 may include local area networks (LANs), wide area networks (WANs), telecommunication networks, or other suitable types of networks. In some embodiments, computer system 370 may be similar to or identical in configuration to illustrated system 300, whereas in other embodiments, computer system 370 may be configured substantially different than system 300.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A memory controller comprising:
a memory interface configured to couple to a memory; and
a control unit coupled to the memory interface, wherein the control unit is configured to store a first parameter indicating a maximum number of carry-over memory requests that are allowed to be executed during a predetermined time period, and a second parameter indicating a maximum number of new memory requests that are allowed to be executed during the predetermined time period;
wherein the control unit is further configured to determine a memory request limit indicating a maximum number of memory requests that are allowed to be executed during the predetermined time period based on at least the first parameter and the second parameter;

wherein the control unit is configured to determine the memory request limit for the predetermined time period based on the first parameter, the second parameter, and an updated memory request limit from a previous predetermined time period indicating the number of memory requests that are available to be carried over from the previous predetermined time period; and wherein the memory request limit for the predetermined time period is equal to the minimum of the updated memory request limit from the previous predetermined time period and the first parameter, plus the second parameter.

2. The memory controller of claim 1, wherein, if the predetermined time period is the first time period of a sequence of predetermined time periods for executing memory requests, the memory request limit for the predetermined time period is equal to the second parameter.

3. The memory controller of claim 1, wherein control unit is configured to decrement the memory request limit for each memory request that is executed during the predetermined time period to update the memory request limit during the predetermined time period.

4. The memory controller of claim 3, wherein, after executing each memory request and decrementing the memory request limit to update the memory request limit, the control unit is configured to determine whether the updated memory request limit is equal to zero.

5. The memory controller of claim 4, wherein, if the updated memory request limit is equal to zero, the control unit is configured to prevent additional memory requests from executing during the predetermined time period.

6. The memory controller of claim 4, wherein, if the updated memory request limit is greater than zero, the control unit is configured to allow execution of at least one additional memory request.

7. The memory controller of claim 1, wherein, after executing each memory request, the control unit is configured to determine whether the predetermined time period has elapsed.

8. The memory controller of claim 1, wherein the control unit is configured to limit the number of memory requests that are executed within each of a sequence of predetermined time periods, wherein, after a predetermined time period of the sequence of predetermined time periods elapses, the control unit is configured to determine a new memory request limit for a subsequent predetermined time period of the sequence of predetermined time periods.

9. The memory controller of claim 1, wherein the control unit is configured to limit the number of memory requests that are executed within each of a sequence of predetermined time periods to regulate peak and average power consumption.

10. A system comprising:
a memory; and
a control unit coupled to the memory and configured to limit the number of memory requests that are executed within a predetermined time period to regulate power consumption;
wherein the control unit is configured to determine a memory request limit indicating a maximum number of memory requests that are allowed to be executed during the predetermined time period based on at least a first parameter indicating a maximum number of carry-over memory requests that are allowed to be executed during the predetermined time period and a second parameter indicating a maximum number of new memory requests that are allowed to be executed during the predetermined time period;
wherein the memory request limit for the predetermined time period is equal to the minimum of an updated memory request limit from a previous predetermined time period and the first parameter, plus the second parameter.

11. The system of claim 10, wherein control unit is configured to decrement the memory request limit for each memory request that is executed during the predetermined time period to update the memory request limit during the predetermined time period.

12. A method for limiting the number of memory requests that are executed within a predetermined time period, the method comprising:
storing a first parameter indicating a maximum number of carry-over memory requests that are allowed to be executed during the predetermined time period;
storing a second parameter indicating a maximum number of new memory requests that are allowed to be executed during the predetermined time period; and
determining a memory request limit indicating a maximum number of memory requests that are allowed to be executed during the predetermined time period based on at least the first parameter and the second parameter, wherein said determining the memory request limit for the predetermined time period includes:
determining the minimum of an updated memory request limit from a previous predetermined time period and the first parameter; and
summing the minimum and the second parameter to generate the memory request limit for the predetermined time period.

13. The method of claim 12, wherein, if the predetermined time period is the first time period of a sequence of predetermined time periods for executing memory requests, the memory request limit for the predetermined time period is equal to the second parameter.

14. The method of claim 12, further comprising decrementing the memory request limit for each memory request that is executed during the predetermined time period to update the memory request limit during the predetermined time period.

15. The method of claim 14, further comprising, after executing each memory request and decrementing the memory request limit to update the memory request limit, determining whether the updated memory request limit is equal to zero.

16. The method of claim 15, further comprising:
if the updated memory request limit is equal to zero, preventing additional memory requests from executing during the predetermined time period; and
if the updated memory request limit is greater than zero, allowing execution of at least one additional memory request.

* * * * *